United States Patent
Joly et al.

(10) Patent No.: US 11,697,609 B2
(45) Date of Patent: Jul. 11, 2023

(54) MOLD FOR GLASS FORMING AND METHODS FOR FORMING GLASS USING A MOLD

(71) Applicant: 3M INNOVATIVE PROPERTIES COMPANY, St. Paul, MN (US)

(72) Inventors: Samuel F. Joly, Kempten (DE); Georg P. Victor, Wiggensbach (DE); Bernd Ruisinger, Kempten (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/905,022

(22) PCT Filed: Feb. 26, 2021

(86) PCT No.: PCT/IB2021/051626
§ 371 (c)(1),
(2) Date: Aug. 25, 2022

(87) PCT Pub. No.: WO2021/171251
PCT Pub. Date: Sep. 2, 2021

(65) Prior Publication Data
US 2023/0135623 A1     May 4, 2023

(30) Foreign Application Priority Data
Feb. 27, 2020  (EP) .................................. 20159706

(51) Int. Cl.
*C03B 11/08*  (2006.01)
*C04B 35/581*  (2006.01)
*C04B 35/645*  (2006.01)

(52) U.S. Cl.
CPC .......... *C03B 11/084* (2013.01); *C04B 35/581* (2013.01); *C04B 35/645* (2013.01); *C03B 2215/07* (2013.01); *C04B 2235/3409* (2013.01); *C04B 2235/386* (2013.01); *C04B 2235/3865* (2013.01); *C04B 2235/656* (2013.01); *C04B 2235/77* (2013.01); *C04B 2235/786* (2013.01); *C04B 2235/9669* (2013.01)

(58) Field of Classification Search
CPC ............ C03B 35/581; C03B 2235/386; C03B 11/084; C03B 23/03–033
See application file for complete search history.

(56) References Cited

U.S. PATENT DOCUMENTS 6,667,263 B1    12/2003  Guillo et al.
2020/0407266 A1* 12/2020  Suzuki .................... C03C 3/091

FOREIGN PATENT DOCUMENTS

| CN | 105377781 A | 3/2016 |
| CN | 108409115 A | 8/2018 |
| JP | 59162179 A | 9/1984 |
| JP | 03252367 A | 11/1991 |
| JP | 05024866 A | 2/1993 |
| JP | 10025123 A | 1/1998 |
| JP | 11263670 A | 9/1999 |
| JP | 2006089296 A | 4/2006 |
| JP | 2014152053 A | 8/2014 |
| KR | 100605326 B1 | 7/2006 |

OTHER PUBLICATIONS

CN 108409115 A (Yang) Aug. 17, 2018 (English language translation). [retrieved Feb. 28, 2023]. Retrieved from: Clarivate Analytics. (Year: 2018).*
1507 Extended EP Search Report for EP20159706.9, PCT/IB2021/051626, dated Jul. 22, 2020, 4 pages.
International Search Report for PCT Application No. PCT/IB2021/051626 dated May 11, 2021, 6 pages.

* cited by examiner

*Primary Examiner* — Erin Snelting
(74) *Attorney, Agent, or Firm* — Thomas M. Spielbauer

(57) ABSTRACT

The present disclosure relates to a mold for glass forming, wherein the mold comprises a ceramic material, and wherein the ceramic material comprises aluminum nitride and hexagonal boron nitride, and wherein the ceramic material comprises from 50 to 80% by weight of aluminum nitride and from 20 to 50% by weight of hexagonal boron nitride, based on the total weight of the ceramic material. The present disclosure further relates to a process for using such molds to form curved glass plates.

19 Claims, No Drawings

MOLD FOR GLASS FORMING AND METHODS FOR FORMING GLASS USING A MOLD

CROSS REFERENCE TO RELATED APPLICATIONS

This application is a national stage filing under 35 U.S.C. 371 of PCT/IB2021/051626, filed 26 Feb. 2021, which claims the benefit of EP Application No. 20159706.9, filed 27 Feb. 2020, the disclosure of which is incorporated by reference in its/their entirety herein.

TECHNICAL FIELD

The present disclosure relates to a mold for glass forming, the mold comprising a ceramic material comprising aluminum nitride and hexagonal boron nitride. The mold is usable for forming glass plates with curved surfaces.

BACKGROUND

For forming glass such as front and back glasses with curved surfaces for mobile phones, usually a pressure molding process for which molds are used is applied. A flat glass plate is inserted between an upper and a lower part of a mold. This assembly is placed into a furnace and heated up to a temperature which is above the glass transition temperature ($T_g$) of the glass to be formed. Typically, the temperature to which the assembly is heated up is between the glass transition temperature ($T_g$) and the glass softening temperature ($T_s$) of the glass. This temperature is usually between 700° C. and 800° C. The upper part of the mold is then pressed for a defined time against the glass plate and the lower part of the mold, thereby forming the glass plate having a curved surface. Typical glass plates formed by this process are front and back glasses for mobile phones which are glass plates having a curved contour line. The formed glass plate is cooled down at the outlet section of the furnace. Alternatively, only a lower mold or an upper mold can be used, a flat glass plate is placed on the lower mold or on the upper mold, and vacuum may be applied to the glass for forming. The glass material of the formed glass plate is usually an aluminosilicate based glass and can be strengthened by addition of materials such as CaO, $K_2O$ or $Fe_2O_3$. The glass transition temperature ($T_g$) is the temperature above which the solid glass begins to exhibit viscoelastic properties. The glass transition temperature ($T_g$) may also be defined as the temperature at which the glass has a viscosity of $10^{13}$ Poise. The glass softening temperature ($T_s$) is the temperature at which the glass moves under its own weight. The glass softening temperature ($T_s$) may also be defined as the temperature at which the glass has a viscosity of $10^{7.6}$ Poise.

For this glass forming process, molds made from graphite or nickel-chromium based alloys such as Inconel are currently used. These materials can be provided with a fine surface roughness which allows to produce formed glass plates having a surface with no visible defects.

However, these materials currently used show some disadvantages. The heating and forming process needs to be carried out in an oxygen free environment, as these materials are not oxidation resistant at the glass forming temperature. Moreover, graphite is a relatively soft material that can easily be scratched during use and wear over time, and it can lose hardness after repeated heating cycles. Inconel needs to be regularly coated with lubricants to avoid sticking of the glass to the metal-based mold.

JP2014152053A proposes a mold material for glass forming comprising 10-30 wt. % boron nitride and 68-88 wt. % silicon carbide. A disadvantage of this material is that silicon carbide tends to stick at glass at operating temperature.

CN108409115A proposes oxide and nitride ceramic materials as mold material for glass forming, specifically alumina and silicon nitride. Oxide ceramics and also silicon nitride tend to stick at glass at operating temperature.

Therefore, there is still a need for an improved material usable as molds for glass forming, specifically for molds for forming glass plates with curved surfaces.

As used herein, "a", "an", "the", "at least one" and "one or more" are used interchangeably. The term "comprise" shall include also the terms "consist essentially of" and "consists of".

SUMMARY

In a first aspect, the present disclosure relates to a mold for glass forming, wherein the mold comprises a ceramic material, and wherein the ceramic material comprises aluminum nitride and hexagonal boron nitride, and wherein the ceramic material comprises from 50 to 80% by weight of aluminum nitride and from 20 to 50% by weight of hexagonal boron nitride, based on the total weight of the ceramic material.

In another aspect, the present disclosure also relates to a process for producing a mold for glass forming as disclosed herein, wherein the mold comprises a ceramic material, and wherein the process comprises providing an aluminum nitride powder, providing a hexagonal boron nitride powder, mixing the aluminum nitride powder and the hexagonal boron nitride powder, thereby obtaining a raw material mixture, wherein the raw material mixture comprises from 50 to 80% by weight of aluminum nitride and from 20 to 50% by weight of hexagonal boron nitride, based on the total weight of the raw material mixture, filling the raw material mixture into a graphite mold for hot-pressing, hot-pressing the raw material mixture to obtain a densified block of the ceramic material, and machining the densified block to obtain a mold for glass forming.

In yet a further aspect, the present disclosure relates to the use of a mold as disclosed herein in a process of forming glass plates with curved surfaces.

The ceramic material of the mold disclosed herein is not sticking at the glass to be formed at operating temperature. The surface of the mold which is made from the ceramic material and which is in contact with the glass component to be formed during glass forming can be machined by chip-removing processes such as milling. By machining of the contact surface of the mold disclosed herein, a low surface roughness can be achieved which allows to produce formed glass plates having a surface with no visible defects.

The ceramic material of the mold disclosed herein is oxidation resistant at the glass forming temperature. Furthermore, the mold material is harder and more wear-resistant than graphite, and it does not lose hardness after repeated heating cycles. The mold can therefore be used for more glass forming cycles than conventional molds made from graphite. There is no need to regularly coat the mold disclosed herein with lubricants to avoid sticking of the glass to the mold.

DETAILED DESCRIPTION

The mold for glass forming as disclosed herein can be used in a process to form glass material into a desired shape, for example glasses with curved surfaces such as front glasses with curved surfaces for mobile phones. Such glasses with curved surfaces are formed from flat glass plates. In this forming process, the mold is in direct contact with the glass material being heated up to the forming temperature.

The mold comprises a ceramic material. The ceramic material comprises from 50 to 80% by weight of aluminum nitride and from 20 to 50% by weight of hexagonal boron nitride, based on the total weight of the ceramic material.

Advantageously, the mean grain size of the aluminum nitride in the ceramic material may be from 1.0 to 5.0 µm. Preferably, the mean grain size of the aluminum nitride in the ceramic material is from 1.0 to 3.0 µm.

The mean grain size of the aluminum nitride in the ceramic material can be determined by measuring the grain size of aluminum nitride on scanning electron microscopy (SEM) micrographs of polished samples. Micrographs with a magnification of 10,000× are used, and the longest diameter of each individual aluminum nitride grain is measured. The mean grain size is calculated as the average value of the longest diameter of 50 individual aluminum nitride grains.

The mean grain size of the hexagonal boron nitride in the ceramic material may be from 1.0 to 5.0 µm.

The mean grain size of the hexagonal boron nitride in the ceramic material can be determined by measuring the grain size of hexagonal boron nitride on scanning electron microscopy (SEM) micrographs of polished samples. Micrographs with a magnification of 10,000× are used, and the longest diameter of each individual hexagonal boron nitride grain is measured. The mean grain size is calculated as the average value of the longest diameter of 50 individual hexagonal boron nitride grains.

In some embodiments, the ceramic material comprises from 55 to 65% by weight of aluminum nitride and from 35 to 45% by weight of hexagonal boron nitride.

In some embodiments, the ceramic material comprises from 58 to 62% by weight of aluminum nitride and from 38 to 42% by weight of hexagonal boron nitride.

In some embodiments, the ceramic material comprises from 60 to 80% by weight of aluminum nitride and from 20 to 40% by weight of hexagonal boron nitride.

In some embodiments, the ceramic material comprises from 65 to 80% by weight of aluminum nitride and from 20 to 35% by weight of hexagonal boron nitride.

The density of the ceramic material preferably is at least 85%, more preferably at least 87%, of the theoretical density of the ceramic material. In some embodiments, the density of the ceramic material is at least 90%, or at least 92% of the theoretical density of the ceramic material.

The theoretical density of the ceramic material is calculated by the density of the pure aluminum nitride, which is 3.26 g/cm$^3$, and the density of the pure hexagonal boron nitride, which is 2.25 g/cm$^3$, and the respective fractions of aluminum nitride and hexagonal boron nitride in the ceramic material.

The ceramic material may further comprise boron oxide ($B_2O_3$) in an amount of up to 2% by weight, based on the total weight of the ceramic material. Preferably, the ceramic material comprises at most 1.5% by weight of boron oxide ($B_2O_3$), based on the total weight of the composite material. In some embodiments, the ceramic material comprises at most 1.0% by weight of boron oxide ($B_2O_3$), based on the total weight of the composite material.

The ceramic material may comprise an inorganic binder phase. The inorganic binder phase may comprise aluminum borates and/or aluminum oxynitrides. The inorganic binder phase may also comprise further oxides other than boron oxide such as calcium oxide (CaO), yttrium oxide ($Y_2O_3$), magnesium oxide (MgO), lanthanum oxide ($La_2O_3$), aluminum oxide ($Al_2O_3$) and silicon oxide ($SiO_2$). The inorganic binder phase may also comprise mixtures of these oxides or mixed oxides formed from these oxides, or mixed oxides formed from one or more of these oxides and boron oxide, or mixtures of aluminum borates and/or aluminum oxynitrides with one or more of these oxides and mixed oxides. The ceramic material may comprise up to 5% by weight of oxides other than boron oxide.

For densifying the hexagonal boron nitride containing ceramic material by uniaxial hot-pressing, a liquid phase is advantageously used. Boron oxide ($B_2O_3$) may be used to provide the liquid phase.

In order to maintain the desired anti-sticking properties and dimensional stability of the mold, which are provided by hexagonal boron nitride and aluminum nitride, it is preferable that most of the boron oxide phase is transferred in the ceramic material into phases which have melting points higher than the operating temperature of the mold. Typical products of this transfer reaction are aluminum borates and aluminum oxynitrides. The aluminum borate $AlBO_3$ and the aluminum oxynitride $Al_{2.81}O_{3.56}N_{0.44}$ have been detected in the ceramic material by X-ray diffractometry (XRD). Other aluminum borates and aluminum oxynitrides may also be formed.

Optionally, oxides other than boron oxide may be added to the raw material mixture which are able to form with boron oxide in the ceramic material compounds that have melting points higher that the operating temperature of the mold. Such oxides other than boron oxide are calcium oxide (CaO), yttrium oxide ($Y_2O_3$), magnesium oxide (MgO), lanthanum oxide ($La_2O_3$), aluminum oxide ($Al_2O_3$) and silicon oxide ($SiO_2$).

The ceramic material may comprise up to 12% by weight of oxygen, based on the total weight of the ceramic material. Preferably, the ceramic material comprises at most 10% by weight of oxygen, based on the total weight of the ceramic material. More preferably, the ceramic material comprises at most 8% by weight of oxygen, based on the total weight of the ceramic material. In some embodiments, the ceramic material comprises at most 5% by weight of oxygen, based on the total weight of the ceramic material.

The total oxygen content originates from lattice oxygen in boron nitride and aluminum nitride, and from compounds such as aluminum borates, aluminum oxynitrides, boron oxide ($B_2O_3$), and may also originate from further oxides such as calcium oxide (CaO), yttrium oxide ($Y_2O_3$), magnesium oxide (MgO), lanthanum oxide ($La_2O_3$), aluminum oxide ($Al_2O_3$) and silicon oxide ($SiO_2$).

The ceramic material has a hardness of from 50 to 800 HBW 2.5/62.5. In some embodiments, the hardness of the ceramic material is from 50 to 300 HBW 2.5/62.5, e.g., the hardness of the ceramic material may be from 50 to 200 HBW 2.5/62.5. The hardness of the ceramic material can be measured by the Brinell method according to DIN EN ISO 6506-1 (2013). The designation "HBW 2.5/62.5" means that the measurement has been carried out using a hard metal sphere of diameter 2.5 mm and with a load of 62.5 kg.

The flexural strength (4-point) of the ceramic material may be at least 50 MPa, or at least 100 Mpa.

The mold as disclosed herein is used in a process of glass forming. By the process of glass forming, a glass component is formed, such as a front glass of a mobile phone with a curved surface. The mold comprises a contact surface which is in contact with the glass component to be formed during the process of glass forming. The contact surface may have a surface roughness $R_a$ of at most 2.0 μm. Preferably, the contact surface has a surface roughness $R_a$ of at most 1.5 μm. In some embodiments, the contact surface has a surface roughness $R_a$ of at most 1.2 μm, or of at most 1.0 μm. The low surface roughness allows to obtain formed glass plates by the glass forming process having a surface with no visible defects. The contact surface may have a surface roughness $R_a$ of at least 0.2 μm, or of at least 0.3 μm, or of at least 0.4 μm, or of at least 0.5 μm. Preferably, the contact surface has a surface roughness $R_a$ of at least 0.4 μm. In some embodiments, the contact surface may have a surface roughness $R_a$ of at least 0.2 and at most 2.0 μm, or of at least 0.3 and at most 1.5 μm, or of at least 0.4 and at most 1.5 μm, or of at least 0.4 and at most 1.2 μm. The surface roughness $R_a$ is measured according to ISO 4287 (1997). The surface roughness $R_a$ is the arithmetical mean deviation of the assessed profile according to ISO 4287 and may also be referred to as average roughness.

The ceramic material of the mold should comprise at least 50% by weight of aluminum nitride in order to achieve the desired surface quality of the contact surface of the mold, i.e. the low surface roughness $R_a$ of the contact surface as described above.

The mean grain size of the aluminum nitride and the hexagonal boron nitride in the ceramic material of the mold should be at most 5.0 μm, in order to achieve the desired surface quality of the contact surface of the mold, i.e. the low surface roughness $R_a$ of the contact surface as described above.

The mold for glass forming as disclosed herein, wherein the mold comprises a ceramic material, can be produced by a process comprising providing an aluminum nitride powder, providing a hexagonal boron nitride powder, mixing the aluminum nitride powder and the hexagonal boron nitride powder, thereby obtaining a raw material mixture, wherein the raw material mixture comprises from 50 to 80% by weight of aluminum nitride and from 20 to 50% by weight of hexagonal boron nitride, based on the total weight of the raw material mixture, filling the raw material mixture into a graphite mold for hot-pressing, hot-pressing the raw material mixture to obtain a densified block of the ceramic material, and machining the densified block to obtain a mold for glass forming.

In some embodiments, the aluminum nitride powder has a mean particle size ($d_{50}$) of at most 7 μm, e.g., at most 6 μm, at most 5 μm, or even at most 4 μm. The mean particle size ($d_{50}$) of the aluminum nitride powder can be measured by laser diffraction (Mastersizer, wet measurement).

The specific surface area (BET) of the aluminum nitride powder may be from 1 to 5 $m^2/g$.

The oxygen content of the aluminum nitride powder may be up to 2.0% by weight, based on the total weight of the aluminum nitride powder.

The mean particle size of the hexagonal boron nitride powder may be from 0.5 to 5 μm. The mean particle size ($d_{50}$) of the hexagonal boron nitride powder can be measured by laser diffraction (Mastersizer, wet measurement).

The specific surface area (BET) of the hexagonal boron nitride powder may be from 5 to 30 $m^2/g$.

In some embodiments, the hexagonal boron nitride powder comprises 3 to 7%, e.g., 4 to 6%, by weight of boron oxide ($B_2O_3$), based on the total weight of the hexagonal boron nitride powder in the ceramic material. Boron oxide may be added as boric acid ($H_3BO_3$) to the hexagonal boron nitride powder or may be contained in the hexagonal boron nitride powder as a result of the production process of the hexagonal boron nitride powder.

The aluminum nitride powder and the hexagonal boron nitride powder are mixed, thereby obtaining a raw material mixture. Mixing can be carried out as a dry mixing process. Mixing aggregates for dry mixing may be a cube blender, a vibration ball mill or a roller block. Optionally, the raw material mixture may be milled to decrease the mean particle size of the aluminum nitride powder.

Optionally, oxides such as calcium oxide (CaO), yttrium oxide ($Y_2O_3$), magnesium oxide (MgO), lanthanum oxide ($La_2O_3$), aluminum oxide ($Al_2O_3$) and silicon oxide ($SiO_2$) may be added to the aluminum nitride powder and the hexagonal boron nitride powder for mixing of the raw material mixture. The raw material mixture may comprise up to 5% by weight of oxides other than boron oxide, based on the total weight of the raw material mixture.

After mixing, the raw material mixture may optionally be pre-compacted. The raw material mixture is filled into a graphite mold for hot-pressing, and the raw material mixture is hot-pressed to obtain a densified block of the ceramic material. The densified blocks of the ceramic material are also called billets. Hot-pressing is carried out in inert gas atmosphere such as nitrogen or argon. Hot-pressing may be carried out at a temperature of from 1800 to 2200° C. and a pressure of from 10 to 30 MPa.

After hot-pressing, the densified block is machined to obtain a mold for glass forming. The mold is used in a process of glass forming, and a glass component is formed by the process of glass forming. The mold comprises a contact surface. The contact surface is in contact with the glass component to be formed during the process of glass forming. The contact surface may have any desired shape. For example, the contact surface may be curved to correspond to the curved surfaces of front glasses of mobile phones. The contact surface of the mold is machined Machining may be carried out by a chip-removing process. A suitable machining process for the contact surface is milling. Optionally, a subsequent polishing step may follow. Preferably, the contact surface is machined by milling without a subsequent polishing step. It has been found that the contact surface can be machined by milling and no subsequent polishing step is necessary to achieve a surface roughness suitable for the glass forming process for forming glasses with curved surfaces. By machining, a low surface roughness of the contact surface can be achieved. The contact surface may have a surface roughness $R_a$ of at most 2.0 μm. Preferably, the contact surface has a surface roughness $R_a$ of at most 1.5 μm. In some embodiments, the contact surface has a surface roughness $R_a$ of at most 1.2 μm, or of at most 1.0 μm. The contact surface may have a surface roughness $R_a$ of at least 0.2 μm, or of at least 0.3 μm, or of at least 0.4 μm, or of at least 0.5 μm. Preferably, the contact surface has a surface roughness $R_a$ of at least 0.4 μm. In some embodiments, the contact surface may have a surface roughness $R_a$ of at least 0.2 and at most 2.0 µm, or of at least 0.3 and at most 1.5 µm, or of at least 0.4 and at most 1.5 µm, or of at least 0.4 and at most 1.2 µm.

Surprisingly, by machining of the contact surface of the mold by chip-removing processes, aluminum nitride particles do not chip off from the surface of the mold or at least chipping off of aluminum nitride particles can be minimized. Therefore, a low surface roughness can be achieved. This can be related to the low mean grain size of the aluminum nitride and of the hexagonal boron nitride in the ceramic material of the mold.

The mold as disclosed herein can be used in a process of forming glass components, preferably glass plates with curved surfaces. The process of forming glass plates may by a pressure molding process, or a vacuum molding process, or a combination of both.

Further disclosed herein are methods of forming glass components using the moles of the present disclosure.

In some embodiments, both an upper part and a lower part of a mold are used. Such methods comprise:

placing a glass plate between an upper and a lower part of a mold as disclosed herein, to form an assembly, placing the assembly into a furnace and heating it up to a temperature which is above the glass transition temperature of the glass to be formed; and pressing the upper part of the mold for a defined time against the glass plate and the lower part of the mold, thereby forming the glass plate having a curved surface.

In some embodiments, only a one part mold may be used, i.e., either the upper part or lower part of a mold is used. Such methods comprise;

placing a glass plate on a lower mold or on an upper mold as disclosed herein, to form an assembly, placing the assembly into a furnace and heating it up to a temperature which is above the glass transition temperature of the glass to be formed; and applying a vacuum to press the glass plate against the lower mold or the upper mold for a defined time, thereby forming the glass plate having a curved surface.

EXAMPLES

Test Methods

Measurement of Surface Roughness

The surface roughness $R_a$ is measured according to ISO 4287 (1997). The surface roughness $R_a$ is the arithmetical mean deviation of the assessed profile according to ISO 4287 and may also be referred to as average roughness. Surface roughness is measured by the stylus method, using a MarSurf XR 1 (Mahr GmbH, Germany), with a profile filter according to ISO 16610-21 (2011) and calculating the surface roughness parameters according to ISO 4287 (1997). The measurement length was 5.6 mm. The average value is calculated based on 3 measurements.

Hardness Measurement

The hardness of the ceramic material is measured by the Brinell method according to DIN EN ISO 6506-1 (2013). Measurements are carried out using a hard metal sphere of diameter 2.5 mm and with a load of 62.5 kg.

Measurement of Content of Boron Oxide ($B_2O_3$) in the Ceramic Material

The content of boron oxide ($B_2O_3$) in the ceramic material is determined according to DIN 54387-1:2016-10 and 54387-2:2016-12. A sub-sample of the ceramic material is crushed and milled to a particle size <150 µm. Boron oxide is extracted with water from the powdered sample by boiling under reflux for 1 hour. The amount of extracted boron oxide in the suspension is volumetrically measured as boric acid ($H_3BO_3$) using the mannitoboric acid procedure and expressed, taking into account the sample mass, as content of boron oxide ($B_2O_3$) of the ceramic material sample in percentage by weight.

Measurement of Content of Boron Oxide ($B_2O_3$) in Boron Nitride Powder

The content of boron oxide ($B_2O_3$) in the boron nitride powder is determined according to DIN 54387-2:2016-12. Boron oxide is extracted with water from a boron nitride powder sample at 60° C. for 1 hour. The amount of extracted boron oxide in the boron nitride—water suspension is volumetrically measured as boric acid ($H_3BO_3$) using the mannitoboric acid procedure and expressed, taking into account the sample weight, as content of boron oxide ($B_2O_3$) of the boron nitride powder sample in percentage by weight.

Measurement of Total Oxygen Content in the Ceramic Material

The content of total oxygen in the ceramic material is determined according to DIN 54387-1:2016-10 and 54387-3:2016-12. A sub-sample of the ceramic material is crushed and milled to a particle size <150 µm. The amount of oxygen in the powdered sample is measured by CGHE method (carrier gas hot extraction, or inert gas fusion analysis) using high-temperature graphite crucibles and nickel as a melt forming additive and expressed, taking into account the sample weight, as content of total oxygen of the ceramic material sample in percent by weight.

Measurement of Total Oxygen Content in Aluminum Nitride Powder

The content of total oxygen in the aluminum nitride powder is determined according to DIN 54387-3:2016-12. The amount of oxygen in the aluminum nitride powder sample is measured by CGHE method (carrier gas hot extraction, or inert gas fusion analysis) using high-temperature graphite crucibles and nickel as a melt forming additive and expressed, taking into account the sample weight, as content of total oxygen of the aluminum nitride powder sample in percent by weight.

Measurement of Lattice Oxygen Content in Hexagonal Boron Nitride Powder

In a first step, the water-soluble boron oxide ($B_2O_3$) in the hexagonal boron nitride powder is removed by a washing process with water at 60° C. In a second step, the content of lattice oxygen in the boron nitride powder is determined according to DIN 54387-3:2016-12. The amount of oxygen in the boron nitride powder sample is measured by CGHE method (carrier gas hot extraction, or inert gas fusion analysis) using high-temperature graphite crucibles and nickel as a melt forming additive and expressed, taking into account the sample weight, as content of total oxygen of the hexagonal boron nitride powder sample in percent by weight.

Measurement of Mean Grain Size of the Aluminum Nitride in the Ceramic Material

The mean grain size of the aluminum nitride in the ceramic material can be determined by measuring the grain size of aluminum nitride on SEM (scanning electron microscopy) micrographs of polished samples. Micrographs with a magnification of 10,000× are used, and the longest diameter of each individual aluminum nitride grain is measured. The mean grain size is calculated as the average value of the longest diameter of 50 individual aluminum nitride grains.

Measurement of Mean Particle Size ($d_{50}$) of Aluminum Nitride Powder

Measurement is carried out by laser diffraction, using a Mastersizer 2000 (Malvern). A sample of aluminum nitride powder is dispersed in water with a wetting agent and is ultrasonically treated for 90 seconds in an ultrasonic bath plus during the measurement with a setting of 20% for the internal ultrasonic source of the Mastersizer. Measurement is carried out while stirring with 1750 rpm and with 20% for the internal ultrasonic source. The average value is calculated based on 3 measurements.

Measurement of Mean Particle Size ($d_{50}$) of Hexagonal Boron Nitride Powder

Measurement is carried out by laser diffraction, using a Mastersizer 2000 (Malvern). A sample of hexagonal boron nitride powder is dispersed in ethanol and treated for 30 seconds with setting of 70% for the internal ultrasonic source of the Mastersizer. Measurement is carried out while stirring with 1750 rpm and without internal ultrasonic source. The average value is calculated based on 3 measurements.

Example 1

In a cube blender, 31 kg of aluminum nitride powder and 21 kg of boron nitride powder were pre-mixed. An aluminum nitride powder having a mean particle size ($d_{50}$) of 4.7 µm and an oxygen content of 0.78 wt. % was used. A boron nitride powder having a mean particle size ($d_{50}$) of 3.8 µm, a lattice oxygen content of 0.7 wt. %, and a content of boron oxide ($B_2O_3$) of 5 wt. % was used.

After pre-mixing, a further mixing step was carried out in a vibration mill with hard metal balls. In this step, aluminum nitride is slightly milled towards the final mean particle size. The mixed powder was then compacted by cold isostatic pressing and granulated by a screen granulator. The granulated mixed powder was then filled in a graphite mold. Uniaxial hot-pressing was carried out at a temperature of 2100° C. and a pressure of 23 MPa. A densified billet of a ceramic material comprising aluminum nitride and boron nitride with a diameter of 320 mm and a height of 350 mm was obtained.

The hot-pressed billet had a density of 94% of theoretical density. The content of boron oxide ($B_2O_3$) in the ceramic material was 0.7 wt. %, the total oxygen content was 2.4 wt. %. The Brinell hardness was 152 HBW 2.5/62.5. The flexural strength (4-point) of the ceramic material was 118 MPa, the Young's modulus was 44.5 GPa.

Phase analysis by X-ray diffractometry (XRD) showed, besides the main phases aluminum nitride and hexagonal boron nitride, secondary phases of aluminum borate ($AlBO_3$) and the aluminum oxynitride $Al_{2.81}O_{3.56}N_{0.44}$.

The mean grain size of the aluminum nitride in the ceramic material is 4.4 µm. The mean grain size of the aluminum nitride in the ceramic material is determined by SEM as described above.

Samples with dimensions 210×60×20 mm³ were cut from the hot-pressed billet. On these plates, surfaces with dimensions 210×60 mm² were milled with a feed rate of 150 mm/min and a rotational speed of 8.000 rpm, using a single-lip PCD (polycrystalline diamond) milling tool with a diameter of 16.6 mm. The milled surfaces had a surface roughness $R_a$ of 1.03 µm.

From the hot-pressed billet, molds for glass forming can be machined having any desired shape, for example having curved surfaces, and comprising a contact surface with a smooth surface, for example with a surface roughness $R_a$ of 1.03 µm.

Example 2

Example 1 was repeated, with the exception that the aluminum powder used had a mean particle size ($d_{50}$) of 3.2 µm and an oxygen content of 1.07 wt. %, and the boron nitride powder used had a mean particle size ($d_{50}$) of 3.3 µm, and a lattice oxygen content of 0.9 wt. %. The content of boron oxide ($B_2O_3$) in the hexagonal boron nitride powder also was 5 wt. %. Powder mixing and hot-pressing of the billet was carried out as described for Example 1.

The hot-pressed billet had a density of 94.5% of theoretical density. The content of boron oxide in the ceramic material was 0.5 wt. %, the total oxygen content was 6.0 wt. %. The Brinell hardness was 150 HBW 2.5/62.5. The flexural strength (4-point) of the ceramic material was 117 MPa, the Young's modulus was 41 GPa.

Phase analysis by X-ray diffractometry (XRD) showed, besides the main phases aluminum nitride and hexagonal boron nitride, secondary phases of aluminum borate ($AlBO_3$) and the aluminum oxynitride $Al_{2.81}O_{3.56}N_{0.44}$.

The mean grain size of the aluminum nitride in the ceramic material is 2.4 µm. The mean grain size of the aluminum nitride in the ceramic material is determined by SEM as described above.

Samples with dimensions 210×60×20 mm³ were cut from the hot-pressed billet. On these plates, surfaces with dimensions 210×60 mm² were milled with a feed rate of 150 mm/min and a rotational speed of 8.000 rpm, using a single-lip PCD (polycrystalline diamond) milling tool with a diameter of 16.6 mm. The milled surfaces had a surface roughness $R_a$ of 0.85 µm.

From the hot-pressed billet, molds for glass forming can be machined having any desired shape, for example having curved surfaces, and comprising a contact surface with a smooth surface, for example with a surface roughness $R_a$ of 0.85 µm.

Example 3

Example 2 was repeated, with the exception that uniaxial hot-pressing was carried out at a temperature of 1950° C. instead of 2100° C. and at a pressure of 23 MPa. The hot-pressed billet had a density of 90% of theoretical density. The content of boron oxide in the ceramic material was 0.97 wt. %, the total oxygen content was 2.7 wt. %. The Brinell hardness was 55 HBW 2.5/62.5. The flexural strength (4-point) of the ceramic material was 61 MPa, the Young's modulus was 33 GPa.

Phase analysis by X-ray diffractometry (XRD) showed, besides the main phases aluminum nitride and hexagonal boron nitride, secondary phases of the aluminum oxynitride $Al_{2.81}O_{3.56}N_{0.44}$ and $AlB_2$.

The mean grain size of the aluminum nitride in the ceramic material is 2.7 µm. The mean grain size of the aluminum nitride in the ceramic material is determined by SEM as described above.

Samples with dimensions 137×130×5 mm³ were cut from the hot-pressed billet. On these plates, surfaces with dimensions 137×130 mm² were milled with a feed rate of 150 mm/min and a rotational speed of 10.000 rpm, using a single-lip PCD (polycrystalline diamond) milling tool with a diameter of 19.6 mm. The milled surfaces had a surface roughness $R_a$ of 0.99 µm.

From the hot-pressed billet, molds for glass forming can be machined having any desired shape, for example having curved surfaces, and comprising a contact surface with a smooth surface, for example with a surface roughness $R_a$ of 0.99 µm.

Reference Example 5

Example 1 was repeated, with the exception that the aluminum powder used had a mean particle size ($d_{50}$) of 9.8 µm and an oxygen content of 0.85 wt. %, and the boron nitride powder used had a mean particle size ($d_{50}$) of 3.7 µm, and a lattice oxygen content of 0.8 wt. %. The content of boron oxide ($B_2O_3$) in the hexagonal boron nitride powder also was 5 wt. %. Powder mixing and hot-pressing of the billet was carried out as described for Example 1.

The hot-pressed billet had a density of 93% of theoretical density. The content of boron oxide in the ceramic material was 0.7 wt. %, the total oxygen content was 3.2 wt. %. The Brinell hardness was 106 HBW 2.5/62.5. The flexural strength (4-point) of the ceramic material was 88 MPa, the Young's modulus was 37.6 GPa.

The mean grain size of the aluminum nitride in the ceramic material is 6.0 µm. The mean grain size of the aluminum nitride in the ceramic material is determined by SEM as described above.

Samples with dimensions 210×60×20 mm³ were cut from the hot-pressed billet. On these plates, surfaces with dimensions 210×60 mm² were milled with a feed rate of 150 mm/min and a rotational speed of 8.000 rpm, using a single-lip PCD (polycrystalline diamond) milling tool with a diameter of 16.6 mm. The milled surfaces had a surface roughness $R_a$ of 3.23 µm.

This material has proven to be unsuitable as mold material for glass forming, as the surface of this material when milled is too rough and not smooth enough for the glass forming process. When using the ceramic material of the Reference Example for producing a mold for glass forming, defects on the surface of the formed glass component are visible to the naked eye.

The invention claimed is:

1. A mold for glass forming, wherein the mold comprises a ceramic material comprising from 50 to 80% by weight of aluminum nitride and from 20 to 50% by weight of hexagonal boron nitride, based on the total weight of the ceramic material,
and wherein the mean grain size of the aluminum nitride in the ceramic material is from 1.0 to 5.0 µm,
and wherein the density of the ceramic material is at least 85% of the theoretical density of the ceramic material,
and wherein the ceramic material further comprises boron oxide ($B_2O_3$) in an amount of up to 2% by weight, based on the total weight of the ceramic material,
and wherein the ceramic material has a hardness of from 50 to 300 HBW 2.5/62.5, wherein the hardness is measured by the Brinell method according to DIN EN ISO 6506-1 (2013),
and wherein the mold has a contact surface having a surface roughness $R_a$ of at least 0.2 µm and at most 2.0 µm,
and wherein the mean grain size of the aluminum nitride in the ceramic material is determined by measuring the grain size of aluminum nitride on scanning electron microscopy (SEM) micrographs with a magnification of 10,000× of polished samples, wherein the longest diameter of each individual aluminum nitride grain is measured and the mean grain size is calculated as the average value of the longest diameter of 50 individual aluminum nitride grains,
and wherein the theoretical density of the ceramic material is calculated by the density of the pure aluminum nitride, which is 3.26 g/cm³, and the density of the pure hexagonal boron nitride, which is 2.25 g/cm³, and the respective fractions of aluminum nitride and hexagonal boron nitride in the ceramic material,
and wherein the surface roughness of the contact surface is measured according to ISO 4287 (1997).

2. The mold according to claim 1, wherein the mean grain size of the aluminum nitride in the ceramic material is from 1.0 to 3.0 µm.

3. The mold according to claim 1, wherein the ceramic material comprises from 55 to 65% by weight of aluminum nitride and from 35 to 45% by weight of hexagonal boron nitride.

4. The mold according to claim 1, wherein the ceramic material comprises from 60 to 80% by weight of aluminum nitride and from 20 to 40% by weight of hexagonal boron nitride.

5. The mold according to claim 1, wherein the ceramic material comprises up to 12% by weight of oxygen, based on the total weight of the ceramic material.

6. A method of forming a glass component having a curved surface, the method comprising
placing a glass plate between an upper part of a mold and a lower part of a mold to form an assembly, wherein the upper part of the mold is a mold according to claim 1 and the lower part of the mold is a mold according to claim 1,
placing the assembly into a furnace and heating it up to a temperature which is above the glass transition temperature of the glass to be formed; and
pressing the upper part of the mold for a defined time against the glass plate and the lower part of the mold, thereby forming the glass component having a curved surface.

7. The method of claim 6, wherein the glass plate is brought into contact with the contact surface of the upper part of the mold and the contact surface of the lower part of the mold, wherein at least one of the contract surfaces is curved.

8. The method of claim 7, wherein both of the contact surfaces are curved.

9. The method of claim 6, wherein the ceramic material comprises from 55 to 65% by weight of aluminum nitride and from 35 to 45% by weight of hexagonal boron nitride, based on the total weight of the ceramic material.

10. The method of claim 6, wherein the mean grain size of the aluminum nitride in the ceramic material is from 1.0 to 3.0 µm.

11. The method of claim 6, wherein the density of the ceramic material is at least 87% of the theoretical density of the ceramic material.

12. The method of claim 6, wherein the ceramic material comprises up to 8% by weight of oxygen, based on the total weight of the ceramic material.

13. A method of forming a glass component having a curved surface, the method comprising
placing a glass plate on a mold according to claim 1 to form an assembly, wherein the mold is a lower mold or an upper mold,
placing the assembly into a furnace and heating it up to a temperature which is above the glass transition temperature of the glass to be formed; and
applying a vacuum for a defined time, thereby forming the glass component having a curved surface.

14. The method of claim 13, wherein the glass plate is brought into contact with the contact surface of the mold.

15. The method of claim 14, wherein the contact surface is curved.

16. The method of claim 13, wherein the ceramic material comprises from 55 to 65% by weight of aluminum nitride and from 35 to 45% by weight of hexagonal boron nitride, based on the total weight of the ceramic material.

17. The method of claim 13, wherein the mean grain size of the aluminum nitride in the ceramic material is from 1.0 to 3.0 μm.

18. The method of claim 13, wherein the density of the ceramic material is at least 87% of the theoretical density of the ceramic material.

19. The method of claim 13, wherein the ceramic material comprises up to 8% by weight of oxygen, based on the total weight of the ceramic material.

\* \* \* \* \*